US011281467B2

United States Patent
Bouzguarrou et al.

(10) Patent No.: US 11,281,467 B2
(45) Date of Patent: Mar. 22, 2022

(54) MAINTAINING PREDICTION DATA USED TO PREDICT WHETHER A BRANCH REPRESENTED BY A BRANCH INSTRUCTION WILL BE TAKEN

(71) Applicant: Arm Limited, Cambridge (GB)

(72) Inventors: Houdhaifa Bouzguarrou, Valbonne (FR); Guillaume Bolbenes, Antibes (FR); Vincenzo Consales, Paca (FR)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 16/654,372

(22) Filed: Oct. 16, 2019

(65) Prior Publication Data

US 2020/0133673 A1 Apr. 30, 2020

(30) Foreign Application Priority Data

Oct. 25, 2018 (GB) ...................................... 1817362

(51) Int. Cl.
*G06F 9/38* (2018.01)
*G06F 9/30* (2018.01)

(52) U.S. Cl.
CPC ........ *G06F 9/3804* (2013.01); *G06F 9/30101* (2013.01); *G06F 9/3844* (2013.01); *G06F 9/3806* (2013.01)

(58) Field of Classification Search
CPC .................................................... G06F 9/3804
See application file for complete search history.

(56) References Cited

U.S. PATENT DOCUMENTS

| | | | |
|---|---|---|---|
| 2008/0052499 A1 | 2/2008 | Koc | |
| 2009/0089564 A1 | 4/2009 | Brickell et al. | |
| 2015/0268957 A1* | 9/2015 | Bonanno | G06F 9/3806 |
| | | | 712/239 |
| 2017/0322810 A1* | 11/2017 | Navada | G06F 9/3806 |
| 2019/0138315 A1 | 5/2019 | Bolbenes et al. | |
| 2019/0166158 A1* | 5/2019 | Grocutt | H04L 63/1441 |

OTHER PUBLICATIONS

Evtyushkin et al., "BranchScope: A New Side-Channel Attack on Directional Branch Predictor", ASPLOS 18, Mar. 24-28, 2018, pp. 693-707.
Wikipedia entry, "Branch Predictor", last edited Sep. 10, 2018, 10 pages.
Combined Search and Examination Report for GB1817362.5, dated Apr. 26, 2019, 6 pages.

* cited by examiner

*Primary Examiner* — Michael J Metzger
(74) *Attorney, Agent, or Firm* — Nixon & Vanderhye P.C.

(57) ABSTRACT

Circuitry comprises a prediction register having one or more entries each storing prediction data; prediction circuitry configured to map a value of the stored prediction data to a prediction of whether or not a branch represented by a given branch instruction is predicted to be taken, according to a data mapping; and control circuitry configured to selectively vary the data mapping between the prediction and the value of the stored prediction data.

14 Claims, 5 Drawing Sheets

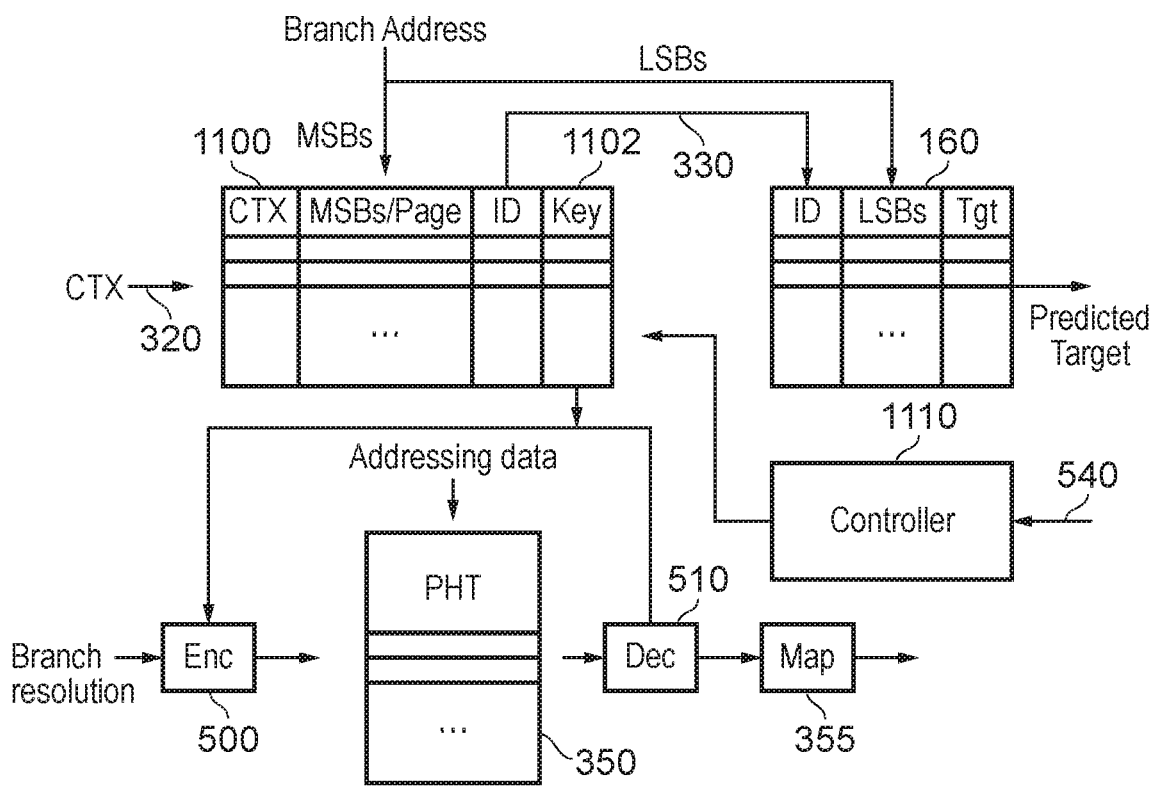

MAINTAINING PREDICTION DATA USED TO PREDICT WHETHER A BRANCH REPRESENTED BY A BRANCH INSTRUCTION WILL BE TAKEN

This application claims priority to GB Patent Application No. 1817362.5 filed 25 Oct. 2018, the entire contents of which is hereby incorporated by reference.

BACKGROUND

This disclosure relates to circuitry and methods.

In some data processing applications, so-called branch prediction is used to predict instances of non-linear program flow, such as the outcome (branch taken or branch not taken) from conditional program flow branching instructions.

In some examples, the branch prediction process runs ahead of the execution of the instructions to provide the instructions speculatively in time to avoid so-called starvation (which would occur if insufficient instructions (that were next to be executed) were fetched in time for execution.

In order to predict the presence of a branch into a given program code portion, a historical data store such as a so-called branch target buffer (BTB) can provide an indication of previously taken branches at particular program counter (PC) values. For example, an attribute of the data item representing the previously taken branch, such as the PC value or part of it, can be used as the basis of a mapping between the data item and a storage location in the BTB.

SUMMARY

In an example arrangement there is provided circuitry comprising:

a prediction register having one or more entries each storing prediction data;

prediction circuitry configured to map a value of the stored prediction data to a prediction of whether or not a branch represented by a given branch instruction is predicted to be taken, according to a data mapping; and control circuitry configured to selectively vary the data mapping between the prediction and the value of the stored prediction data.

In another example arrangement there is provided circuitry comprising:

means for storing one or more entries each storing prediction data;

means for mapping a value of the stored prediction data to a prediction of whether or not a branch represented by a given branch instruction is predicted to be taken, according to a data mapping; and means for selectively varying the data mapping between the prediction and the value of the stored prediction data.

In another example arrangement there is provided a method comprising:

storing one or more entries each representing prediction data;

mapping a value of the stored prediction data to a prediction of whether or not a branch represented by a given branch instruction is predicted to be taken, according to a data mapping; and selectively varying the data mapping between the prediction and the value of the stored prediction data.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 7-10 schematically illustrated the generation of respective event signals;

FIG. 11 schematically illustrates another variation of prediction circuitry.

DESCRIPTION OF THE EMBODIMENTS

Figure 1:
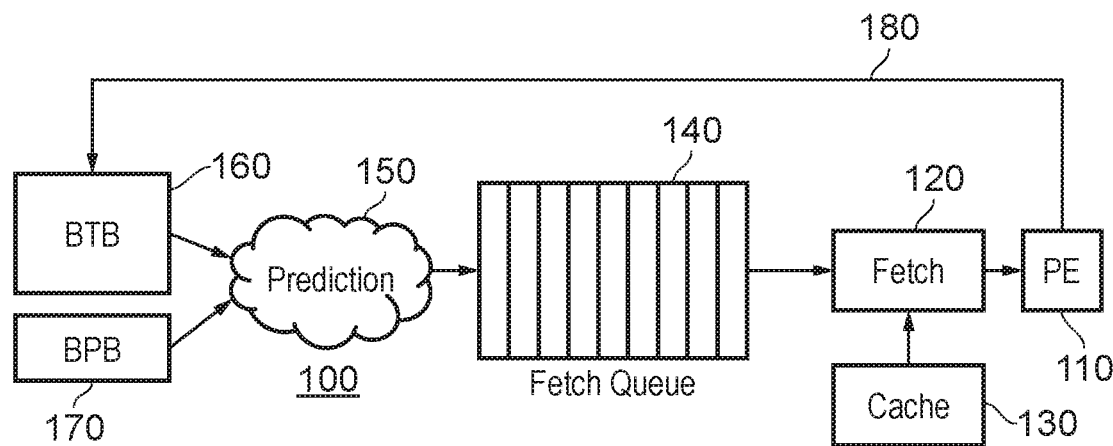
FIG. 1 schematically illustrates an example of data processing circuitry.

FIG. 1 is a schematic example of data processing circuitry 100 comprising a processing element (PE) 110 to execute program code instructions and fetch circuitry 120 to fetch blocks, containing instruction for execution, from memory and/or a cache 130 such as an instruction cache. The blocks to be fetched are defined by a fetch queue 140. The data processing circuitry also comprises prediction circuitry 150 to predict one or more next blocks to be fetched and to add the predicted next blocks to the fetch queue 140.

The prediction circuitry 150 makes reference to branch target storage including at least a branch target buffer (BTB) 160 and to a branch prediction buffer (BPB) 170. These are drawn separately for clarity of the diagram but may be considered part of the prediction circuitry 150. The BTB 160 provides information which associates program counter (PC) values of an instruction to be executed with an associated branch target in the case that the instruction is a branch instruction. The BPB 170 stores historical data about the outcome (branch taken or branch not taken) of previous instances of the branch instructions, the historical data allowing the prediction circuitry 150 to arrive at a prediction of whether a particular branch instruction indicated by the BTB 160 will be taken or not taken.

Various mechanisms may be used by the prediction circuitry 150 to predict the "taken" or "not taken" status for an expected branch instruction. An example of such a technique is provided in U.S. Ser. No. 15/806,605 and https://en.wikipedia.org/wiki/Branch_predictor, the contents of each of which are hereby incorporated by reference. The prediction circuitry 150 uses such a technique to predict blocks (or portions, or granules, or even in an extreme example individual instructions) of program code to be fetched and adds data identifying such blocks to the fetch queue 140, on a first-in, first-out basis. The fetch circuitry 120 retrieves such data from the fetch queue 140 on the same basis (which is to say, the fetch circuitry 120 retrieves the least-recently-added entry or entries in the fetch queue 140) and initiates fetching of the blocks indicated by those entries. The required blocks may be in the cache 130 or may need to be retrieved from a main memory or higher level cache (not shown in FIG. 1).

In due course, the processing element 110 executes the fetched blocks of program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched (or code at a branch target has been fetched but the branch, when resolved, was not in fact taken) and the fetch and execution pipelines have to be flushed, incurring a delay while the correct blocks of program code are fetched for execution.

The processing element can provide information 180 back to the BTB 160 and BPB 170 relating to branch instructions actually encountered during execution, as well as their actual outcome. Where a branch instruction is encountered during execution (at least for a branch instruction where the branch is actually taken, though possibly for all branch instructions), information can be stored in the BTB 160 relating to the target of that branch instruction. Information relating to the outcome of the branch instruction (taken/not taken) can also be stored in the BPB 170.

FIG. 1 therefore provides an example of a data processor 100 having a processing element 110 to execute data processing instructions; fetch circuitry 120 to fetch instructions for execution, defined by entries in a fetch queue 140; and prediction circuitry 150, 160, 170 to generate entries for the fetch queue defining one or more next data processing instructions to be fetched; the prediction circuitry comprising circuitry as defined below, in which in at least some examples the circuitry provides branch target storage to store one or more data items each comprising at least part of a program counter value and information defining a respective branch target address for a previously taken branch instruction, in which the attribute of a data item is dependent at least upon the program counter value.

Figure 2:
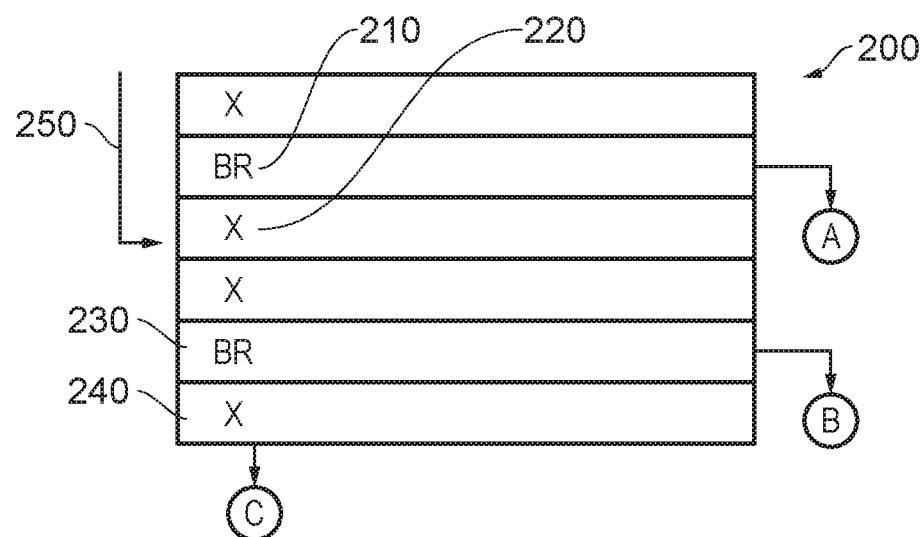
FIG. 2 schematically illustrates a series of data processing instructions.

FIG. 2 schematically illustrates a series of data processing instructions forming an example of a program code block, portion or granule 200. In the schematic representation of FIG. 2, six instructions are illustrated, but in example embodiments of the present disclosure the blocks of instructions may have a consistent base length (in bytes), being for example a power of two or at least a multiple of two, and are address-aligned in memory to positions representing multiples of the base length. For example, each portion may have a base length of 16 bytes and the portions may be aligned to 16 byte boundaries in memory.

In FIG. 2, the successive instructions are indicated as either "X" or "BR". The "X" instructions are non-branching instructions and are represented in this schematic manner to indicate that it is irrelevant to the present discussion what type of instruction they are. The "BR" instructions are conditionally branching instructions which can lead to a non-linear change in program flow depending on one or more parameters on the basis of which branch decision is taken.

Referring to a first example branch instruction 210, if the branch represented by this instruction is taken, then program flow is diverted to another program counter value A. If not, program flow continues to the next sequential instruction 220. Similarly, if the branch at a branch instruction 230 is taken, program flow is diverted to a program counter value B, but if not, flow continues to the next sequential instruction 240. Therefore, as a result of execution of the portion 200, program flow can:

redirect to the program counter value A;
redirect to the program counter value B; or
continue to the next-in-order program counter value C (in a next granule, not shown).

Note that branch targets or destinations do not have to be aligned with the beginning of a portion such as the portion 200. In fact, a branch from elsewhere may enter the portion 200 at any instruction position, for example at the instruction 220 for an incoming branch 250.

Figure 3:
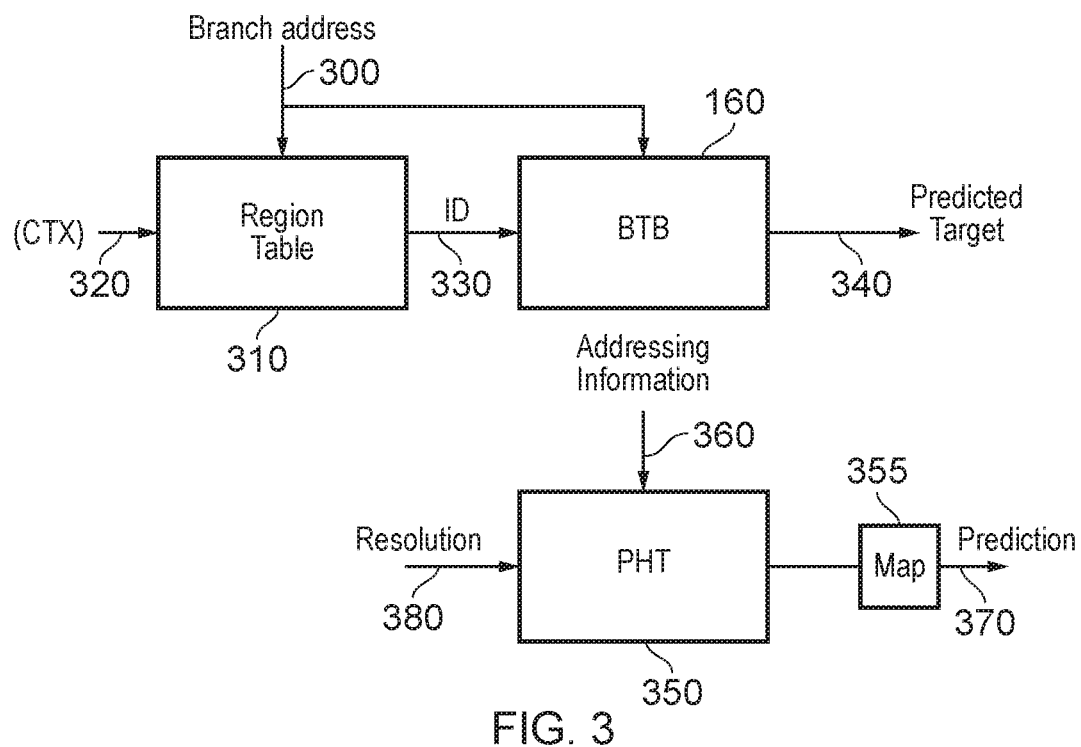
FIG. 3 schematically illustrates the operation of prediction circuitry.

FIG. 3 schematically illustrates an example of the operation of the prediction circuitry 150 including the functionality of the BTB 160 and the BPB 170.

Regarding the BTB 160, this receives a branch address 300 or program counter (PC) value, for example being the next PC value in the sequence described with reference to FIG. 2. A region table 310 maps the branch address, and in some examples a processor context 320 onto an identification (ID) value 330, for example by providing a mapping between memory page identifiers or sets of most significant bits (MSBs) of the branch address and ID values. So, to retrieve an ID value, the region table makes use of a subset of the branch address 300.

The BTB 160 also makes use of a subset of the branch address, in this example a set of least significant bits (LSBs) and contains multiple entries each mapping a permutation of (ID, set of LSBs) to a predicted branch target address 340.

The BTB 160 will output the predicted branch target address 340 in any instance where there is an appropriate entry within the BTB 160, which is to say that the outputting of the predicted branch target address 340 by the BTB 160 is, in at least this example, independent of a prediction (to be discussed below) of whether the relevant branch will actually be taken.

Regarding the prediction of whether the branch is actually taken, various techniques are available such as one shown by way of example in FIG. 3 which involves the use of a so-called pattern history table (PHT) 350, forming at least a part of the BPB 170 mentioned above.

The PHT 350 provides a so-called adaptive branch prediction in which the recent history of whether a branch was taken or not taken is used to select a respective version of prediction information stored by the PHT 350 for the current branch instruction.

For example, to provide a prediction, a two-bit saturating counter may be used, representing a state machine with four states:

| | |
|---|---|
| 00 | Strongly not taken |
| 01 | Not taken |
| 10 | Taken |
| 11 | Strongly taken |

Here, the term "strongly" simply indicates that with the saturating counter scheme, it will take two successive instances of that prediction being incorrect in order to change the prediction represented by the saturating counter (so, to move from 00, strongly not taken, to 10, taken, requires two successive increments of the saturating counter before the actual prediction represented by the state of the saturating counter changes from a prediction of "not taken" to a prediction of "taken".

The saturating counter is updated in response to the actual resolution of a branch instruction. If the resolution of a relevant branch instruction is "taken" then the saturating counter is incremented, subject to saturation at the value 11. If the resolution of the relevant branch instruction is "not taken" then the saturating counter is decremented, subject to saturation at the value 00.

In terms of its adaptive operation, the PHT 350 stores (and selects from, for a given branch instruction) a plurality of entries each representing, for example, a two-bit saturating counter of the type described above. The PHT 350 accesses a relevant entry according to addressing information 360 to be discussed below and provides that counter value to mapping circuitry 355 which applies the mapping given in the table above to output a prediction 370 of "taken" (for a counter value of 10 or 11) or "not taken" (for a counter value of 00 or 01) depending on the contents of the addressed PHT entry.

When the resolution of that branch instruction is determined, the resolution is communicated 380 to the PHT 350 (as shown schematically as the information 180 in FIG. 1) and the relevant saturating counter is addressed once again and updated by an increment or a decrement depending on whether or not the branch was taken. In this way, the prediction circuitry is configured to modify the stored prediction data in dependence upon a resolution of whether the branch represented by the given branch instruction (relevance to the stored entry) is taken or not.

As mentioned above, the PHT 350 provides a plurality of entries and an individual entry is selected for a given branch instruction according to the addressing information 360.

Figure 4:
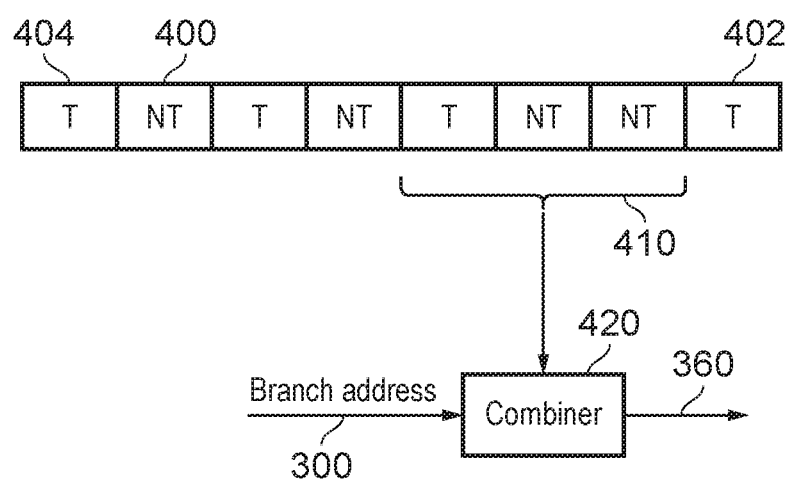
FIG. 4 schematically illustrates address data generation.

Various possibilities are available for generating the addressing information 360. In an example shown schematically in FIG. 4, a history register 400 maintains a history of recent outcomes of branch instruction execution, from a most recent outcome 402 to a least recent (in the terms of the size of the history register 400) outcome 404. As a branch instruction is resolved, it outcome is inserted at the most recent outcome position 402 and the other contents of the history register are shuffled towards the least recent outcome position 404. In practical terms, this may be achieved using a circular buffer and moving pointers, but the effect is as described above. In FIG. 4, the historical outcomes are shown as T (taken) or NT (not taken) but these may be stored as respective bit values such as 1, 0.

The history register 400 can be a global history register such that the outcomes stored in the history register 400 relate to all executed branch instructions, or could be a local history register such that the stored branch outcomes related to outcomes of a branch instruction at a particular branch address (PC value). In the current example, the history register 400 is a global history register. A subset 410 of bits of the history register 400, for example at a predetermined position relative to the most recent 402 and the least recent 404 positions in the history register, can be used as an input in the generation of the addressing information 360.

Therefore, in these examples of a local history register, each prediction register entry comprises a plurality of prediction data values, and the prediction circuitry is configured to select one of the prediction data values for use as the prediction data for a given branch instruction according to a permutation of most recent resolutions of whether the branch represented by the given branch instruction is taken or not.

Another possible contribution to the addressing information 360 is the branch address 300, or at least a subset of its bits. One or both of these inputs may be combined by a combiner 420 to generate the addressing information 360. For example, the combiner could include a logical exclusive-or (XOR) function. In other examples, the combiner 420 may include a hashing function.

A hashing function is, in this context, a generic function which maps a data input to a data output. In the context of accessing entries in the PHT, a desirable feature of a suitable hashing function is that relatively similar branch addresses are mapped to relatively disparate entries or locations within the PHT.

Figure 5:
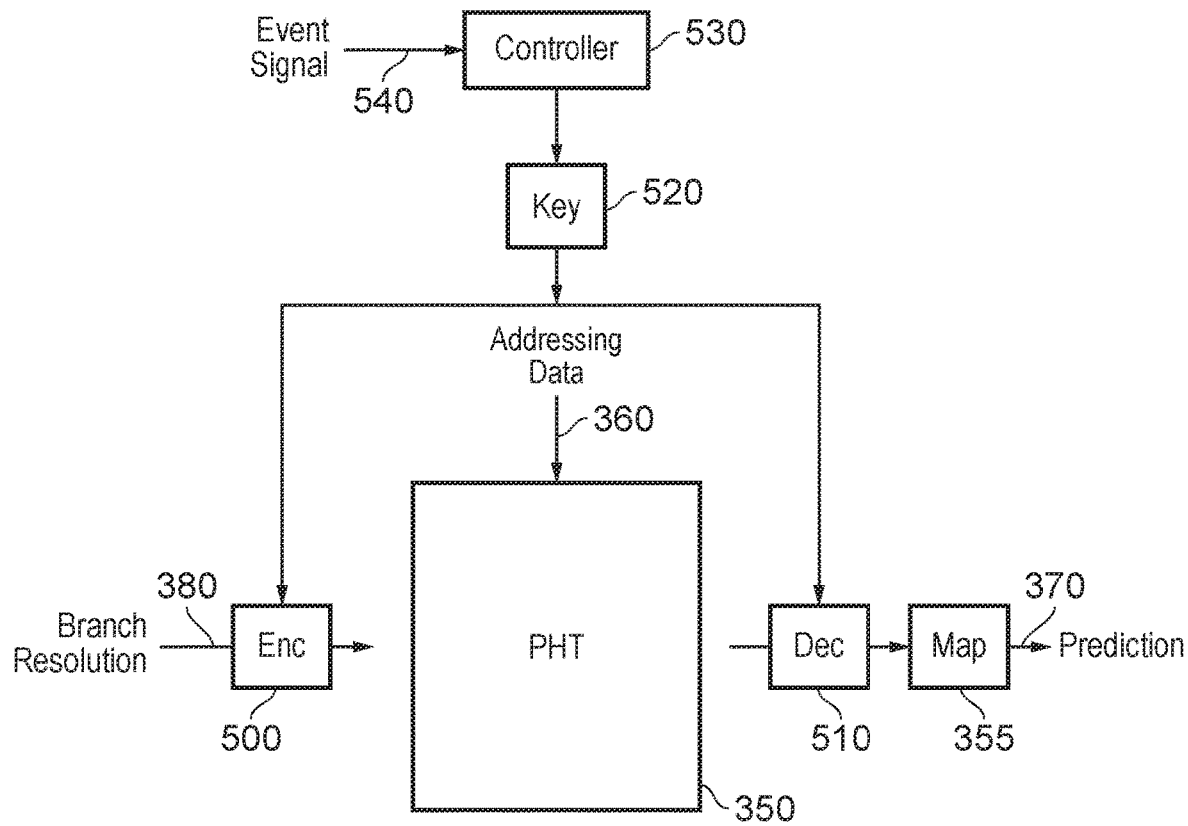
FIG. 5 schematically illustrates the operation of a pattern history table.

FIG. 5 schematically illustrates an alternative arrangement relating to the PHT 350. As before, the PHT 350 is addressed by addressing data 360 which may be generated by any of the various techniques discussed above. However, the mapping between values stored by the PHT 350 and the nature of the prediction 370 is subject to variation using techniques to be discussed below.

One example of a data mapping between the prediction 370 and the values of the prediction data stored by the PHT 350 was discussed above and is summarised as:

| 00 | Strongly not taken |
|----|--------------------|
| 01 | Not taken          |
| 10 | Taken              |
| 11 | Strongly taken     |

In FIG. 5, a schematic encoder 500 and corresponding decoder 510 operating under the control of a key value 520, are used to encode and decode the store values in the PHT 350 so that even when the prediction 370 is "taken" for decoded PHT data of 10 or 11 and is "not taken" for decoded PHT data of 00 or 01, the actual PHT data stored in entries of the PHT 350 leading to those outcomes may not be the same as the decoded data from which the prediction is actually derived.

In this way, the data mapping comprises, at least in part, and encryption function defined at least in part by the key value 520

Therefore, in at least some examples, the mapping circuitry 355 may operate as discussed above, namely using the mapping for "taken" (counter value of 10 or 11) and "not taken" (counter value of 00 or 01).

Techniques for setting the key value 520 will be discussed below, but in general terms, the use of a potentially varying data mapping between the prediction 370 and the value of the stored prediction data in the PHT 350 can potentially help to alleviate the effect of a so-called BranchScope attack on the operation of data processing apparatus. The BranchScope attack is discussed in the paper "BranchScope: A New Side-Channel Attack on Directional Branch Predictor", Evtyushkin et al, ASPLOS'18, Mar. 24-28, 2018, Williamsburg, Va., USA, and attempts to use a branch direction predictor such as the PHT 350 to leak information between secure "victim" program code and malicious "attacker" program code, by detecting, directly or indirectly, the contents of the PHT 350 and the effect of successive variations of those contents.

In response to a change in the key value 520, the actual data stored in the PHT 350 is not necessarily changed (though in some embodiments the stored data could itself be re-encrypted in response to a change in the value 520) but its significance in the generation of the prediction 370 is changed. This can at least partially reduce the effectiveness of a BranchScope type of attack.

The key value 520 may be under the control of a controller at 530 responsive to, for example, an event signal 540 to be discussed further below.

Therefore, in these examples, the prediction circuitry 350, 355 is configured (using the encoder 500 and the decoder 510) to apply the data mapping in dependence upon a key value 520, and the control circuitry 530 is configured to change the key value.

FIG. 5 therefore provides an example of circuitry comprising a prediction register (such as the PHT 350) having one or more entries (in some examples, two or more entries) each storing prediction data, prediction circuitry (such as the mapping circuitry 355 and the decoder 510) which together map a value of the stored prediction data to a prediction 370 of whether or not a branch represented by a given branch instruction is predicted to be taken, according to a data mapping (this being a logical combination of the mapping used by the mapping circuitry 355 and the mapping applied by the decoder 510), and control circuitry 530, 520, acting in conjunction with the encoder 500 and the decoder 510, to selectively vary the data mapping between the prediction 370 and the value of the prediction data stored by the PHT 350.

The encoder 500 and decoder 510 can be implemented as encryption and decryption circuitries, but in a conveniently straightforward example they are in fermented as exclusive or (XOR) operations which combine the key value 520 with the counter data to be stored by the PHT 350. For example, the key value 520 may have the same number of bits as the number of bits of the saturating counter used to create the PHT 350 entries.

In an example in which the encoder 500 and decoder 510 are XOR functions and the saturating counter value stored by the PHT 350 and the key value 520 each have two bits, the mapping between eventual predictions 370 and data stored by entries of the PHT 350 is as follows:

|  | Key = 00 | Key = 01 | Key = 10 | Key = 11 |
|---|---|---|---|---|
| Strongly not taken | 00 | 01 | 10 | 11 |
| Not taken | 01 | 00 | 11 | 10 |
| Taken | 10 | 11 | 00 | 01 |
| Strongly taken | 11 | 10 | 01 | 00 |

The decoder 510 reverses the effect of the encoding according to the key value 520 so that irrespective of the current value of the key value 520, the mapping circuitry 355 can continue to use the mapping given above, namely:

| 00 | Strongly not taken |
|---|---|
| 01 | Not taken |
| 10 | Taken |
| 11 | Strongly taken |

Figure 6:
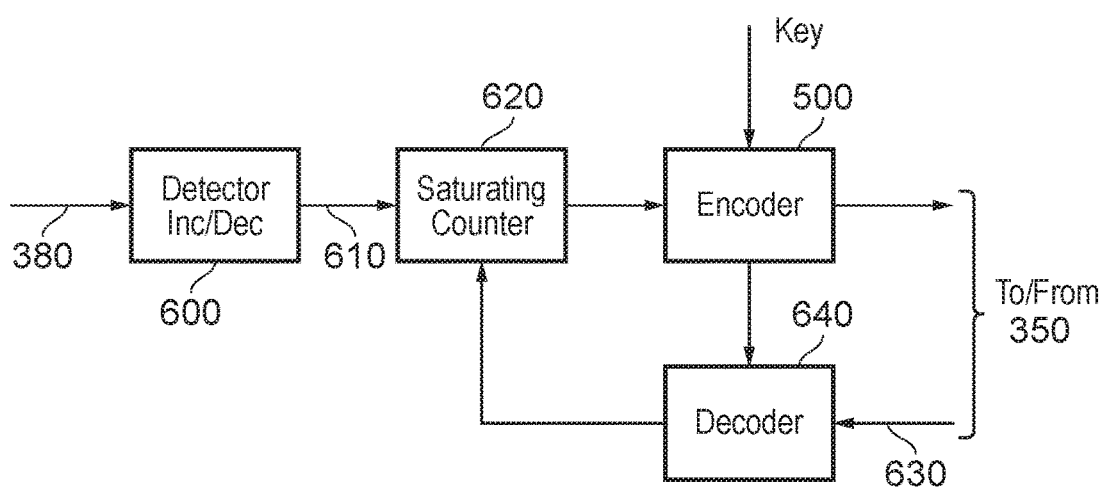
FIG. 6 schematically illustrates an updating operation.

FIG. 6 shows in further schematic detail the operation of the encoder 500 in association with the updating of a particular entry in the PHT 350.

The branch resolution 380 is provided to a detector 600 which detects, according to the branch resolution 280, whether the saturating counter value should be incremented (for a branch taken) or decremented (for a branch not taken). The increment or decrement indication 610 is provided to a saturating counter 620 which receives the current stored PHT data value 630 which is decoded by a decoder 640, then incremented or decremented by the saturating counter 620 subject to the saturation values of 00 and 11, with the output then being encoded by the encoder 500 and re-stored in the PHT 350.

The use of a key value 520 and a complimentary encoder 500 and decoder 510 provides a convenient way of changing the data mapping. In other examples, the encoder 500 and decoder 510 could operate according to a plurality of predetermined mappings, with a selection between those predetermined mappings being made according to a control signal, for example from the controller 530.

A change in the key value can occur for various reasons within the system of FIG. 5. For example, the control circuitry 530, 520 may, as mentioned above, be responsive to an event signal 540 to prompt the controller 530 to change the key value 520, for example in a cyclic, pseudorandom or other order of changed values. In this way, the control circuitry 530 may be responsive to a trigger event, as indicated by the event signal 540, to vary the data mapping between the prediction 370 and the value of the prediction data stored by the PHT 350, by means of changing the key value 520. Various examples of such trigger events will be described with reference to FIGS. 7-10.

Referring to FIG. 7, the trigger event comprises the receipt of an interrupt by a processing element associated with the circuitry of FIG. 5, such as the processing element 110 of FIG. 1 which, in response to an external interrupt signal 700 generates an interrupt-driven event signal 710 to form the event signal 540.

In FIG. 8, the processing element 110 executes a predetermined program instruction to generate an instruction-initiated event signal 800 to form the event signal 540.

In FIG. 9, a hardware device 900, such as a peripheral device associated with the apparatus of FIG. 1, generates a hardware-driven event signal 910 so that a change in state of a hardware control signals forms the event signal 540.

In FIG. 10, a change of a data value stored in a predetermined register 1000 or storage location is interpreted by the controller 530 as the event signal 540.

More than one of these sources of event signal can be used, for example being combined by effectively a logical OR operation so that if any source of an event signal indicates an event of this nature, then the controller 530 initiates a change to the key value 520.

Another possible arrangement is shown schematically in FIG. 11. FIG. 11 includes a region table 1100 and a BTB 160 similar to those described above with reference to FIG. 3. Here, however, the region table 1100 not only maps the current processor context 320 and a memory page and/or address MSBs to the ID value 330, but the mapping is also performed to a key value 1102. The key value 1102 is provided to the encoder 500 and the decoder 510 in the same manner as the key value 520 in FIG. 5 and, from the point of view of the operation of the encoder 500, the PHT 350, the decoder 510 and the mapping circuitry 355, operation is similar to that shown in FIG. 5. The main differences in FIG. 11 relate to the source of the key value used to vary the mapping.

A controller 1110 controls the population of the key value parameter 1102 in the range table 1100 in response to execution, by the processing element 110, of a newly encountered context leading to the generation of mappings in the range table 1100 for a new context value 320.

The key values 1102 can be allocated on the basis of one key value per context, one key value per page or set of MSBs, or both. The range table 1100 is conveniently used to store the association between key values 1102 and (context and/or page and/or address MSBs).

Note that in some examples, the controller 1110 may also be responsive to the event signal 540 to initiate a change of key value and a rewriting of at least a currently used set of entries in the range table 1100.

Therefore, the techniques discussed above relating to the storage of the key value 1102 in the range table 1100 provide examples in which the control circuitry 1110, 1100, 500, 510 is configured to use a key value 1102 dependent upon at least a current processing context of a processing element 110 associated with the circuitry. As discussed, in other examples, the control circuitry 1110, 1100, 500, 510 can be configured to use a key value dependent upon at least a memory page of program code containing the given branch instruction. The region table 1100 is configured to store a plurality of entries, each entry defining an association between at least a memory page, an identifier such as a memory page identifier, a processor context identifier and the key value.

The controller 1110 can be configured to generate a key value 1102 for use with a given memory page in a given processor context in response to initiation of allocation of an entry in the region table to the given memory page in the given processor context.

Figure 12:
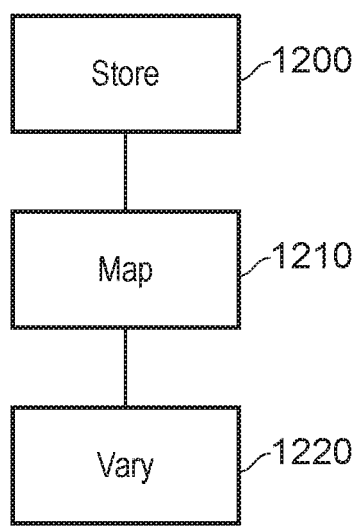
FIG. 12 is a schematic flowchart illustrating a method.

FIG. 12 is a schematic flowchart illustrating a method comprising:

storing (at a step 1200) one or more entries each representing prediction data;

mapping (at a step 1210) a value of the stored prediction data to a prediction of whether or not a branch represented by a given branch instruction is predicted to be taken, according to a data mapping; and selectively varying (at a step 1220) the data mapping between the prediction and the value of the stored prediction data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Circuitry comprising:
a prediction register having one or more entries each storing prediction data;
an encoder to apply an encoding operation to generate the prediction data for storing in the prediction register;
prediction circuitry configured to map a branch prediction value of the stored prediction data to a prediction of whether or not a branch represented by a given branch instruction is predicted to be taken, according to a data mapping, the prediction circuitry incorporating a decoder to reverse, as part of the data mapping, the effect of the encoding operation performed by the encoder; and
control circuitry configured to control operation of the encoder and decoder to selectively vary the data mapping between the prediction and the branch prediction value of the stored prediction data.

2. Circuitry according to claim 1, in which the control circuitry is responsive to a trigger event to vary the data mapping between the prediction and the branch prediction value of the stored prediction data.

3. Circuitry according to claim 2, in which the trigger event comprises an event selected from the list consisting of:
receipt of an interrupt by a processing element associated with the circuitry;
a change of state of a hardware control signal;
a change of a data value stored in a predetermined register or storage location; and
execution of a predetermined program instruction by the processing element associated with the circuitry.

4. Circuitry according to claim 1, in which:
the prediction circuitry is configured to apply the data mapping in dependence upon a key value; and
the control circuitry is configured to change the key value.

5. Circuitry according to claim 4, comprising a processing element;
in which the control circuitry is configured to use a key value dependent upon at least a current processing context of the processing element.

6. Circuitry according to claim 5, in which the control circuitry is configured to use a key value dependent upon at least a memory page of program code containing the given branch instruction.

7. Circuitry according to claim 6, comprising a region table to store a plurality of entries, each entry defining an association between at least a memory page, a memory page identifier, a processor context identifier and the key value.

8. Circuitry according to claim 7, in which the control circuitry is configured to generate a key value for use with a given memory page in a given processor context in response to initiation of allocation of an entry in the region table to the given memory page in the given processor context.

9. Circuitry according to claim 4, in which the data mapping comprises an encryption function defined at least in part by the key value.

10. Circuitry according to claim 1, in which the encoder is configured to modify the stored prediction data in dependence upon a resolution of whether the branch represented by the given branch instruction is taken or not.

11. Circuitry according to claim 10, in which:
the prediction register comprises two or more entries storing respective prediction data;
the prediction circuitry is configured to select a respective prediction register entry for the given branch instruction.

12. Circuitry according to claim 11, in which each prediction register comprises a plurality of prediction data values, and the prediction circuitry is configured to select one of the prediction data values for use as the prediction data for the given branch instruction according to a permutation of most recent resolutions of whether the branch represented by the given branch instruction is taken or not.

13. Circuitry comprising:
means for storing one or more entries each storing prediction data;
means for encoding to apply an encoding operation to generate the prediction data for storing in the means for storing;
means for mapping a branch prediction value of the stored prediction data to a prediction of whether or not a branch represented by a given branch instruction is predicted to be taken, according to a data mapping, the means for mapping incorporating means for decoding to reverse, as part of the data mapping, the effect of the encoding operation performed by the means for encoding; and means for controlling the operation of the means for encoding and means for decoding to selectively vary the data mapping between the prediction and the branch prediction value of the stored prediction data.

14. A method comprising:

storing within a prediction register one or more entries each representing prediction data;

applying an encoding operation to generate the prediction data for storing in the prediction register;

mapping a branch prediction value of the stored prediction data to a prediction of whether or not a branch represented by a given branch instruction is predicted to be taken, according to a data mapping, the mapping incorporating a decoding operation to reverse, as part of the data mapping, the effect of the encoding operation; and controlling the encoding operation and the decoding operation to selectively vary the data mapping between the prediction and the branch prediction value of the stored prediction data.

\* \* \* \* \*